United States Patent [19]
Apte et al.

[11] Patent Number: 5,902,429
[45] Date of Patent: May 11, 1999

[54] METHOD OF MANUFACTURING INTERMETALLIC/CERAMIC/METAL COMPOSITES

[75] Inventors: Prasad S. Apte, St. Albert; Stephen F. J. Corbin, Edmonton, both of Canada

[73] Assignee: Westaim Technologies, Inc., Fort Saskatchewan, Canada

[21] Appl. No.: 08/506,493

[22] Filed: Jul. 25, 1995

[51] Int. Cl.⁶ .......................... B32B 31/26; C04B 38/06; C04B 41/88
[52] U.S. Cl. .................................. 156/89.28; 156/89.25; 156/89.27; 264/44; 264/628
[58] Field of Search .................................. 156/89, 89.28, 156/89.25, 89.27; 264/59, 60, 65, 66, 43, 44, 610, 628, 642, 650, 681, 682, 683; 428/545

[56] References Cited

U.S. PATENT DOCUMENTS

| | | | |
|---|---|---|---|
| 4,033,400 | 7/1977 | Gurwell et al. | 164/98 |
| 4,080,414 | 3/1978 | Anderson et al. | 264/44 X |
| 4,510,000 | 4/1985 | Kumar et al. | 156/89 |
| 4,777,152 | 10/1988 | Tsukada | 501/80 |
| 4,777,153 | 10/1988 | Sonuparlak et al. | 264/44 X |
| 4,828,008 | 5/1989 | White et al. | 164/66.1 |
| 4,919,718 | 4/1990 | Tiegs et al. | 75/232 |
| 5,015,610 | 5/1991 | Dwivedi | 501/127 |
| 5,019,539 | 5/1991 | Claar et al. | 501/87 |
| 5,114,886 | 5/1992 | Tsukada | 501/88 |
| 5,139,977 | 8/1992 | Dwivedi | 501/127 |
| 5,164,347 | 11/1992 | Kennedy et al. | 501/127 |
| 5,372,777 | 12/1994 | Yang | 419/476 |
| 5,395,807 | 3/1995 | Divakar et al. | 264/44 X |
| 5,405,562 | 4/1995 | Kondo et al. | 264/44 |
| 5,585,190 | 12/1996 | Newkirk et al. | 428/469 |

FOREIGN PATENT DOCUMENTS

| | | |
|---|---|---|
| 2121864 | 11/1994 | Canada . |
| 0 452 275 | 10/1991 | European Pat. Off. . |
| 91/1728 | 11/1991 | WIPO . |
| 9705083 | 2/1997 | WIPO . |

OTHER PUBLICATIONS

D.W. Richerson, Modern Ceramic Engineering, 2nd Ed, pp. 471–477, 1992.
Moreno, The Role of Slip Additives in Tape–Casting Technology: Part I—Solvents and Dispersants American Ceramic Society Bulletin pp. 1521 to 1530 vol. 71, No. 10, Oct. 1992.
Moreno, The Role of Slip Additives in Tape Casting Technology: Part II —Binders and Plasticizers American Ceramic Society Bulletin pp. 1647 to 1657 vol. 71, No. 11, Nov. 1992.
Mistler, et al., Tape Casting of Cermics pp. 411 to 448.
McCoy, et al., Fabrication of Carbide Intermetallic Composite Powders by Reaction Synthesis pp. 179 to 187.
Misiolek et al., Reactive sintering and reactive hot isostatic compaction of aluminide matrix composites.

*Primary Examiner*—Curtis Mayes
*Attorney, Agent, or Firm*—Arne I. Fors

[57] ABSTRACT

Novel processes are provided for the production of porous ceramic preforms, metal activated porous ceramic preforms and intermetallic/ceramic/metal composites. These products are all manufactured using processes which are based on tape casting techniques.

4 Claims, 1 Drawing Sheet

METHOD OF MANUFACTURING INTERMETALLIC/CERAMIC/METAL COMPOSITES

FIELD OF THE INVENTION

The present invention relates to novel processes for the production of net or near net shaped porous ceramic preforms, ceramic preforms having graded porosity and metal activated ceramic preforms. The invention extends to intermetallic/ceramic/metal composites fabricated from the aforementioned preforms. In particular, the invention concerns use of the novel ceramic preforms in combination with a reactive molten metal infiltration step to prepare intermetallic/ceramic/metal composites.

BACKGROUND OF THE INVENTION

Porous ceramic preforms typically are prepared using powder pressing techniques and find application as catalysts, filters or as preforms in the manufacture of metal/ceramic composites by molten metal infiltration techniques.

In U.S. Pat. Nos. 5,114,886 and 4,777,152, there are described the most commonly used methods for the production of porous ceramic parts.

The '886 patent teaches a method which involves mixing a coarse ceramic powder having spherical particles with a finer powder, compacting the admixed powders and a binder to form a green body and sintering the body until the powders fuse together at their contact points. The porosity is created by the spaces left between the particles. A first major disadvantage of this method is that the strength of the porous preform is low because the linkages between the powder aggregates are limited. Secondly, there is only limited and indirect control over the amount, size and shape of the porosity. The amount of porosity is determined primarily by the size of the selected ceramic powders. The size and shape are determined by the arrangement and size of the ceramic aggregates. High levels of porosity lead to extreme fragility of the preform.

K. Tsukada in U.S. Pat. No. 4,777,152 discloses a porous preform prepared from two crystalline forms of silicon carbide. In this case, the ceramic aggregates are plate-like in shape, which improves the linkages between aggregates, thereby improving the preform strength. Again, the process provides indirect control over the porosity and can only be used to make porous silicon carbide ceramics.

A variant is exemplified by Canadian Laid-Open Application 2,121,864. Silicon carbide powder is admixed with a preceramic organopolysiloxane prior to pressing and sintering. During sintering, the organopolysiloxane reacts to form silicon carbide and carbon which not only assists in binding the original silicon carbide powder together but also creates porosity. As in the '152 process described supra, control over porosity is limited and the process is restricted to the fabrication of silicon carbide preforms.

Additionally, the disadvantages inherent in such ceramic preforms are that they lack accuracy in shape and in dimensional control.

Ceramic preforms having graded porosity are very difficult to produce by the above-described processes.

U.S. Pat. Nos. 5,019,539, 5,164,347, 5,015,610 and 5,139,977 disclose processes for the production of porous and dense ceramic composites. The basic process involves the oxidation of a molten metal which is directed into a ceramic powder bed positioned thereabove. Porosity is created by controlling the oxidation conditions. Deleteriously, it is not possible to obtain direct control of the porosity. However, as exemplified in U.S. Pat. No. 5,019,539, it is possible to obtain preforms having some degree of gradation in their porosity. This is attained by changing the particle size of the ceramic powder at differing locations in the ceramic bed. However, the graded porosity cannot be controlled either in a discrete, stepwise fashion or controlled over a wide range.

Composite products consisting of a metal matrix and reinforcing phase, such as ceramic particles, show enhanced material properties in combining some of the stiffness and wear resistance of the reinforcing phase, with the ductility and toughness of the metal matrix. However, the high temperature mechanical properties, wear resistance and corrosion resistance of the metal phase can be a limiting factor in certain applications of these composites. Thus, it has been determined that by substituting the metal matrix with an intermetallic matrix, such as nickel aluminide, a composite exhibiting much improved properties is formed.

Illustrative of the prior art with respect to the preparation of metallic/ceramic composites using infiltration techniques are the disclosures of U.S. Pat. No. 4,033,400 issued to Gurwell et al. The patent provides a biskeletal composite which is formed of a bonded silicon nitride host. A metallic infiltrant material is heated to its liquidus temperature and forced by pressure into the host. Unfortunately, in order to apply the requisite high pressure complex apparatus is needed. Additionally, the preform is open to damage by the applied pressure. Furthermore, the porous preform is fabricated by sintering ceramic powder, thus giving rise to the known attendant disadvantages of sintering processes.

A variation of the process for manufacturing metallic/ceramic composites is disclosed in U.S. Pat. No. 4,828,008 which teaches the selection of an infiltrating alloy and gaseous atmosphere functional to cause the metal to spontaneously infiltrate a loose ceramic powder bed. This is a result of the excellent 'wetting' properties existing between the ceramic and the metal alloy. The process is limitative in that aluminum alloys must be used, said alloys must contain at least 1 wt % magnesium and must be carried out in a nitrogen atmosphere. An inherent disadvantage of the process resides in the fact that it can only produce composites wherein the ceramic is a dispersed particulate phase having a metal matrix.

U.S. Pat. No. 5,372,777 describes a process for producing a graded, composite microstructure. The process involves complicated treatments including settling of the particles in conjunction with repeated infiltration steps whereby direct control over the degree of grading is difficult.

Shaped intermetallic/ceramic/metal components may be formed utilizing thermomechanical forming routes such as extrusion or forming. Alternatively, casting processes may be used. Both methods are expensive and involve complex techniques.

Another, more commonly employed approach for the manufacture of components formed of intermetallic/ceramic/metal composite materials is that of powder metallurgy. Exemplary processes are described in U.S. Pat. No. 4,919,718, or the paper by Misiolek and German in "Materials Science and Engineering", Volume A 144 (1991) pp 1–10. An alternative process founded on powder metallurgy is given by McCoy and Shaw in "Advances in Powder Metallurgy and Particulate Materials" (1994) Volume 5. A major drawback with powder metallurgical based processes resides in the difficulty in obtaining fully dense parts. Furthermore, it is virtually impossible to produce parts having graded microstructures and to eliminate the dispersion of the ceramic reinforcement phase within the intermetallic metal matrix.

Processes for the fabrication of ceramic components per se are various and well-documented in the literature. Amongst such processes is the tape casting process which is primarily known for the manufacture of ceramics used in electronic applications as described by Mistler, R. E. et al. (1978) Tape Casting of Ceramics, in Ceramic Processing Before Firing G. Y. Onoda and L. L. Hench, eds., Wiley-Interscience, 411–448.

Tape casting techniques involve, in general, preparing a colloidal suspension comprising a ceramic powder, a binder system, a plasticizer and a solvent. The suspension is cast into a thin sheet, and air dried yielding a green body. The tape is subjected to a burnout-cycle to remove pyrolysable slurry additives forming a friable brown body which is subsequently sintered to yield the final product.

SUMMARY OF THE INVENTION

In accordance with the present invention there are provided processes for the production of novel and near net shaped ceramic preforms, ceramic preforms having graded porosity, and metal activated ceramic preforms. Additionally, the invention extends to the fabrication of net or near net shaped intermetallic/ceramic/metal composites. All the processes for the manufacture of the predescribed products are founded on the inclusion of a tape casting technique or variations thereof.

In its simplest embodiment, the invention provides a porous ceramic preform, having controlled specific dimensions and controlled microporosity. The controlled specific dimensions are attained because of the use of tape casting and forming process steps, which permit homogeneous distribution of the ceramic particles, and accurate formability of the green body within a mould to thereby produce a complex shape. The thus attained complex, or net (near net) shape is maintained throughout subsequent processing, right up to the recovery of the fully sintered article. The porous ceramic preform finds application in the manufacture of catalysts, filter components and intermetallic/ceramic/metal components.

Accordingly, the process for producing a porous ceramic preform comprises in combination, the steps of:

a) preparing a colloidal suspension of a ceramic powder, having a particle size in the range of about 0.2 to 2.0 microns, in admixture with a binder, a dispersant, a plasticizer, a solvent and a pyrolysable pore forming agent;

b) casting said colloidal suspension into a thin sheet;

c) drying said sheet to thereby form a tape having preselected pliability properties and microporosity;

d) cutting shaped pieces from said tape;

e) layering a predetermined number of said tape pieces within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;

f) heating said green body at a controlled rate, at temperatures effective to remove the pyrolysable suspension additives and form a porous brown body; and g) firing said brown body at temperatures effective to sinter the ceramic structure to a predetermined degree for a time in the range of about 0.5 to 3 hours to thereby form the porous ceramic preform having controlled microporosity.

It is a further objective of the invention to provide a ceramic preform having graded porosity. Clearly, this can be achieved by preparing tapes of varying porosities using the process described hereabove, and layering the tapes in a die or forming member in the desired sequence. Different porosities may be achieved by varying the quantity of added pore forming agent as well as varying the pore shape and size, the final porosity reflecting the pore forming agent particle morphology.

The invention extends to the preparation of ceramic preforms which contain a metal activator therein, thus conditioning the preform for the further step of metal infiltration. The metal activated ceramic preform functions as an intermediate in the production of an intermetallic/ceramic/metal composite.

The process for the preparation of a porous ceramic preform containing a metal infiltration activator comprises, in combination, the steps of:

a) preparing a colloidal suspension of a ceramic powder, having a particle size in the range of about 0.2 to 2.0 microns, in admixture with a binder, a dispersant, a plasticizer, a solvent, a pyrolysable pore forming agent and a particulate metal activator;

b) casting said colloidal suspension into a thin sheet;

c) drying said sheet to thereby form a tape having preselected pliability properties and dispersed activator embedded therein;

d) cutting shaped pieces from said tape;

e) layering a predetermined number of said tape pieces within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;

f) heating said green body at a controlled rate, at temperatures effective to remove the pyrolysable suspension additives and form a porous brown body;

g) deoxidizing the metal activator by heating said brown body in a reducing atmosphere; and h) firing said brown body at temperatures effective to sinter the ceramic structure to a predetermined degree for a time in the range of about 0.5 to 3 hours to thereby form the porous ceramic preform having dispersed activator embedded therein. Further, the invention concerns intermetallic/ceramic/metal composite structures useful in wear, erosion, corrosion and high temperature applications and the like. The applications for such intermetallic/ceramic/metal components continue to expand rapidly.

The process for producing an intermetallic/ceramic/metal composite comprises, in combination, the steps of:

a) preparing a colloidal suspension of a ceramic powder, having a particle size in the range of about 0.2 to 2.0 microns, in admixture with a binder, a dispersant, a plasticizer, a solvent, a pyrolysable pore forming agent and a particulate metal activator;

b) casting said colloidal suspension into a thin sheet;

c) drying said sheet to thereby form a tape having preselected pliability properties and dispersed metal activator embedded therein;

d) cutting shaped pieces from said tape;

e) layering a predetermined number of said tape pieces within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;

f) heating said green body at a controlled rate, at temperatures effective to remove the pyrolysable suspension additives and form a porous brown body; and g) deoxidizing the metal activator by heating said brown body in a reducing atmosphere; and h) firing said brown body at temperatures effective to sinter the ceramic structure to a predetermined degree for a time in the range of about 0.5 to 3 hours to thereby form a porous ceramic metal activated preform; and i) reactively infiltrating said ceramic preform with a molten metal under predetermined reaction conditions effective to thereby form an intermetallic/ceramic/metal composite.

The invention further extends to a process for preparing a ceramic preform having graded porosity and adapted for reactive metal infiltration which comprises inter alia 1) forming tapes having controlled microporosities and 2) forming tapes having both controlled microporosities and having varying quantities of metal activator embedded therein, cutting shaped pieces of tape from steps 1) and 2), selectively layering a predetermined number of said shaped pieces of tape within a forming member and compacting and heating the laminated tape components to form a green body, pyrolysing the green body to form a brown body, deoxidizing the said brown body to reduce any metal oxides to metal, and firing the brown body at temperatures effective to form a porous ceramic preform having a controlled and graded microporosity with a metal activator embedded therein.

The process for preparing a ceramic preform having graded porosity and adapted for reactive metal infiltration comprises:

1) preparing tapes having controlled microporositics by:
   a) preparing various colloidal suspensions formed from a ceramic powder, having a particle size in the range of about 0.2 to 2.0 microns, in admixture with a binder, a dispersant, a plasticizer, a solvent and at least one pyrolysable pore forming agent;
   b) casting said colloidal suspensions into discrete thin sheets; and
   c) drying said sheets to thereby form tapes having preselected pliability properties and microporosities, said microporosities having determined by adding varying amounts and/or particle sizes of pore forming agents to the differing colloidal suspensions, to thereby form tapes having differing porosities;

2) preparing tapes having controlled microporosities and having varying quantities of metal activator embedded therein by:
   a) preparing various colloidal suspensions formed from a ceramic powder, having a particle size in the range of about 0.2 to 2.0 microns, in admixture with a binder, a dispersant, a plasticizers a solvent, at least one pyrolysable pore forming agent and a particulate metal activator;
   b) casting said colloidal suspensions into discrete thin sheets;
   c) drying said sheets to thereby form tapes having preselected pliability properties and porosities, said porosities being determined by varying the quantity and particle size of the added pore forming agent, and having preselected amounts of dispersed metal activator embedded therein said metal activator being present in differing quantities thereby forming tapes having differing metal activator content;

3) cutting shaped pieces of the tapes formed by steps (1) and (2);

4) selectively layering a predetermined number of said tape pieces, in varying combinations, within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;

5) heating said green body at a controlled rate, at temperatures effective to remove the pyrolysable suspension additives and form a brown body;

6) deoxidizing the brown body by heating it in a reducing atmosphere to thereby convert any formed metal oxides to the metal; and 7) firing said brown body at temperatures effective to sinter the ceramic structure to a predetermined degree for a time in the range of about 0.5 to 3 hours to thereby form the porous ceramic preform having controlled and graded microporosity and having a metal activator embedded therein.

In a still further embodiment of the invention, the porous ceramic preform having graded microporosity with a metal activator embedded therein can be reactively infiltrated with a molten metal to produce a composite having a graded composition by a process which comprises:

1) preparing tapes having controlled microporesities by:
   a) preparing various colloidal suspensions formed from a ceramic powder, having a particle size in the range of about 0.2 to 2.0 microns, in admixture with a binder, a dispersant, a plasticizer, a solvent and at least one pyrolysable pore forming agent;
   b) casting said colloidal suspensions into discrete thin sheets; and
   c) drying said sheets to thereby form tapes having preselected pliability properties and microporositics, said microporosities being determined by adding varying amounts and/or particle sizes of pore forming agents to the differing colloidal suspensions, to thereby form tapes having differing porosities;

2) preparing tapes having controlled microporosities and having varying quantities of metal activator embedded therein by:
   a) preparing various colloidal suspensions formed from a ceramic powder, having a particle size in the range of about 0.2 to 2.0 microns, in admixture with a binder, a dispersant, a plasticizer, a solvent, at least one pyrolysable pore forming agent and a particulate metal activator;
   b) casting said colloidal suspensions into discrete thin sheets;
   c) drying said sheets to thereby form tapes having preselected pliability properties and porosities, said porosities being determined by varying the quantity and particle size of the added pore forming agent, and having preselected amounts of dispersed metal activator embedded therein, said metal activator being present in differing quantifies thereby forming tapes having differing metal activator content;

3) cutting shaped pieces of the tape formed by steps (1) and (2);

4) selectively layering a predetermined number of said tape pieces, in varying combinations, within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;

5) heating said green body at a controlled rate, at temperatures effective to remove the pyrolysable suspension additives and form a brown body;

6) deoxidizing the brown body by heating it in a reducing atmosphere to thereby convert any formed metal oxides to the metal;

7) firing said brown body at temperatures effective to sinter the ceramic structure to a predetermined degree for a time in the range of about 0.5 to 3 hours to thereby form the porous ceramic preform having controlled and graded microporosity and having a metal activator embedded therein; and 8) reactively infiltrating said ceramic preform with a molten metal under predetermined reaction conditions effective to form the desired intermetallic phase whereby said intermetallic/ceramic/metal composite has a graded composition.

As will be evident to those skilled in the art, using a graded ceramic preform produced as one of the embodiments of the invention, and subjecting said preform to a reactive infiltration technique enables the production of a functionally graded intermetallic/ceramic/metal composite.

Advantageously, the microstructure of the present composites is considered to be a three dimensional, two-phased, interpenetrating intermetallic/ceramic composite thereby imparting improved properties thereto. This is in contradistinction to such composites of the prior art wherein two intermixed discreet phases, namely intermetallic and ceramic exist.

Suitable pore forming agents would be selected from graphite, carbon, starch, polyethylene and any suitable particulate, polymer powder.

A suitable binder would be selected from polynmerized alcohols, butyryl and acrylic resins; a dispersant would be selected from phosphate esters, ethoxylate of aster oil, polyethylene oxyethanol and fish oil; a plasticizer would be selected from butylbenzyl phthalate, ethylene glycol, diethylene phthalate and triethylene phthalate; and a solvent would be selected from toluene, methyl ethyl ketone, ethanol isopropanol, methanol, hexane, ethyl acetate, trichloroethylene and mixtures thereof.

Suitable metal activator agents would include one or more of the following; nickel, cobalt, molybdenum, titanium, iron or zirconium. As a general, but not absolute, rule the metal would be a high melting point metal having a melting point above that of the infiltrating metal.

The infiltrators would be chosen from aluminum, nickel, copper, silicon, iron and alloys formed therefrom.

The ceramic component would be selected from zirconium oxide, tungsten carbide, alumina, aluminum nitride, silicon carbide and silicon nitride.

One of the major advantages in utilizing the tape casting technique resides in the capability of being able to fabricate porous preforms into a variety of complex shapes, including thin walled structures, which meet exacting dimensional specifications. Further, by utilizing a tape casting technique, improved formability at the green body stage is obtained which is in contradistinction to the prior art processes wherein a powder pressing process is utilized. Furthermore, as stated previously, using the tape casting process in combination with a pore forming agent enables the easy incorporation of stepwise gradations in porosity providing more direct control over the morphology of the porosity.

DESCRIPTION OF THE DRAWINGS

The method of the invention will now be described with reference to the accompanying figures, in which.

DESCRIPTION OF THE PREFERRED EMBODIMENT

Figure 1:
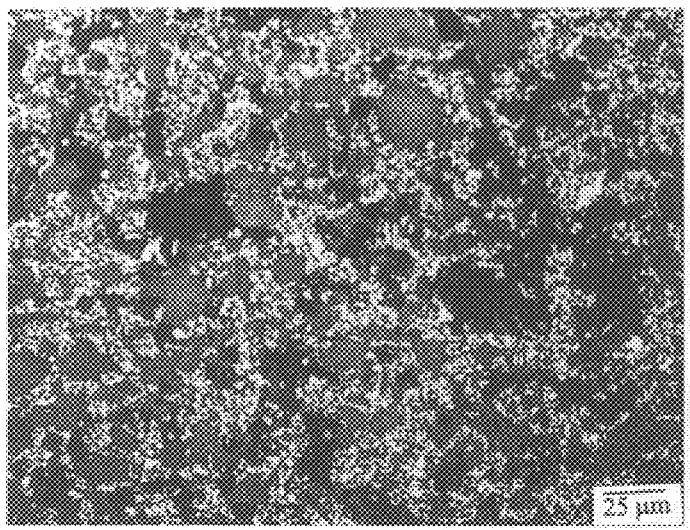
FIG. 1 is a photomicrograph of a sintered but uninfiltrated porous zirconia/metal activated preform wherein the black phase illustrates the interconnected porosity created by the pyrolysis of a starch pore forming agent, the grey area is the interconnected zirconia phase and the white phase is the interconnected sintered nickel phase.
Figure 2:
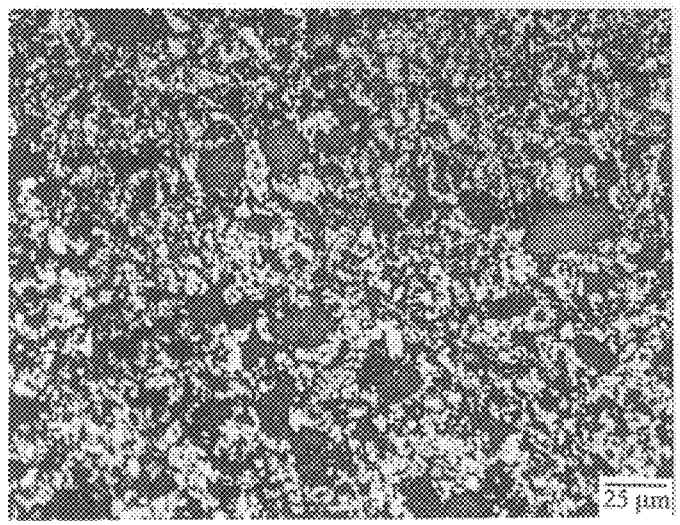
FIG. 2 is a photomicrograph of an infiltrated preform, the dark grey area showing the zirconia phase and the light grey area depicting the nickel aluminide phase.
Figure 3:
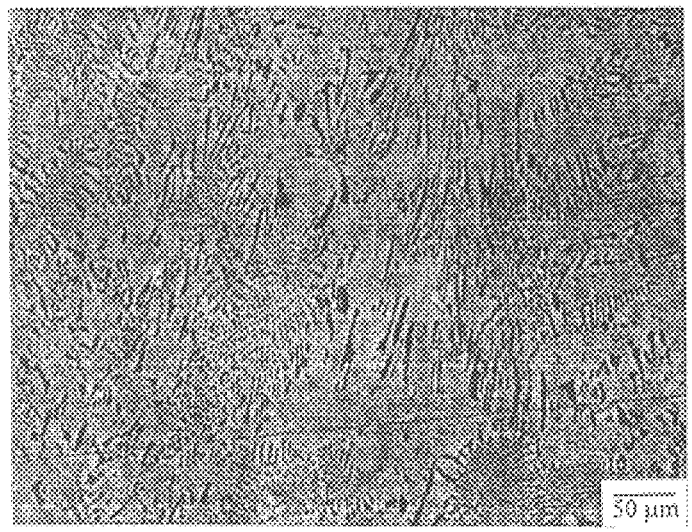
FIG. 3 is a photomicrograph illustrating the excess of the infiltrating metal remaining on top of the porous substrate.

The processes for the production of the ceramic preforms, metal activated preforms and intermetallic/ceramic/metal structures will now be described.

A colloidal suspension (slurry) of a ceramic powder in admixture with a pyrolysable binder, a pyrolysable dispersant, a pyrolysable plasticizer, a volatile solvent, preferably organic, a pyrolysable pore forming agent, and where applicable a metal activator, is initially prepared. In colloidal processing, the ceramic powder is first milled in a slurry to break down soft agglomerates present in the starting powder, separate the fine particles and obtain a uniform distribution of the powder within the slurry. Once this is achieved, binders and plasticizers are added and mixed until dissolved in the solvent.

Any suitable sinterable ceramic powder, selected from zirconium oxide, tungsten carbide, aluminum oxide, aluminum nitride, silicon carbide, silicon nitride and the like may be utilized. One of the preferred ceramic powders, zirconium oxide is available from Tokuyama Soto Inc. The particle size of the ceramic powder ranges from 0.2 to 2.0 micrometers (microns).

The binder is selected from polymerized alcohols, or butyryl and acrylic resins, such as polymethylmethacrylate. The binder content ranges from 5 to 15 weight percent of the slurry.

A pyrolysable dispersant, in an effective amount ranging from 0.5 to 3.0 weight percent of the slurry is selected from the phosphate esters, ethoxylate of castor oil and polyethylene oxyethanol.

Suitable pyrolysable plasticizers such as butylbenzyl phthalate (Santicizer 160™), polyethylene glycol, or various phthalates such as diethylene, triethylene or dioctyl phthalate, are added to the slurry in amounts ranging from between about 1.5 to 5 weight percent of the slurry.

Appropriate solvents would include toluene, methyl ethyl ketone or ethanol or combinations thereof. However, the range of solvents usable in tape casting processes is extensive and also include various alcohols exemplary of which are isopropanol, methanol, as well as hexane, ethyl acetate and trichloroethylene. The solvent content of the slurry ranges from about 25 to 35 weight percent.

Two articles entitled "The Role of Slip Additives in Tape-Casting Techniques" by R. Moreno : Part 1-Solvents and Dispersants (American Ceramic Society Bulletin Volume 71 No.10 October 1992 pp.1521–1531) and Part II Binders and Plasticizers Volume 71 No. 11 November 1992 pp. 1647–1657) respectively detail more extensively possible slurry additives. The disclosures of which are herein incorporated by reference.

The particulate, pyrolysable pore-forming agent is introduced to the colloidal suspension at this stage. Such pore-forming agents may be selected from, for example, graphite, corn starch, polyethylene and suitable polymers and would have a particle size suitable to provide the desired pore size and in an amount effective to provide the desired degree of porosity in the portion, or layer of the tape making up the finished product. It is essential that the pore forming agent utilized have the desired particle shape or form, be insoluble in the selected solvent, provide a controlled burn out and be essentially residue free at the completion of the burnout cycle.

Table I herebelow provides a description of the particulate pore forming agents used and the conditions for their incorporation into the tape.

TABLE I

| Filler Type | Particle[1] Size | Shape | Volume[3] Fraction |
|---|---|---|---|
| Graphite | 75.0 μm | platelet | 0.1 to 0.9 |
| Starch | 10.0 μm | spherical | 0.1 to 0.9 |
| Polyethylene[2] | 125.0 μm | spherical | 0.1 to 0.9 | wherein
[1] the particle size was determined by Microtrac ™ analysis;
[2] this powder had a wide size range with a significant amount of powder in the size range of 40 to 60 μm; significant amount of powder in the size range of 40 to 60 m; and
[3] the total volume is the sum of the ceramic powder and pore forming agent volumes only.

Any suitable sinterable metal activator can be selected such as powders of nickel, zirconium, cobalt, molybdenum, titanium or iron. Since the preform will be infiltrated by a molten metal, the activator must be chosen such that it reacts with the infiltrating metal to form an intermetallic (e.g. Ni when infiltrating with Al).

The thus formed colloidal suspension is poured onto a release film, such as Mylar™ film, using a doctor blade to control the tape thickness. The tape is dried at ambient temperature, the solvents being evaporated under a fume hood. This drying method is functional to maintain a uniform particle distribution within the tape. The dried tape is separated from the release film.

The pliability properties of the thus formed tapes can be adjusted by varying the amount and composition of the slurry additives, in particular the binder and plasticizer.

The formed tape would typically have a thickness ranging from 0.1 to 2 millimeters, but typically the thickness would be in the range of about 0.45 millimeters.

The desired shapes are then punched, or cut, from the tape using conventional equipment.

Lamination takes place as described below. The compaction (lamination) pressure ranges from 10 to 60 MPa. The compaction temperature ranges from about 25° C. to 75° C. Preferably, compaction is undertaken at ambient temperature for about five minutes.

At this stage the green body, which is relatively soft, may be machined, usually to provide finer shape details such as chamfered edges and the like.

The green body is then heated, at a controlled rate, or as stated otherwise in an incremental predetermined stepped rate, in air, at temperatures ranging from about 300° C. to 600° C., for a time ranging from 8 to 48 hours. This heating stage, termed the burnout cycle, is effective to remove the pyrolysable organic additives thereby forming a 'brown' body. The heating is conducted slowly so as to burn off the organics without introducing cracks or blisters into the part. The porous brown body consists of close packed ceramic and metal powders and is fragile.

The brown body is then subjected to a deoxidation step to ensure that any formed metal oxides, in the case wherein a metal activator is being incorporated into the tape, are reduced to the metal. Typically, deoxidation takes place by heating the brown body for a time ranging from 0.2 to 2.0 hours, at a temperature ranging from 500° to 900° C., in an atmosphere consisting of hydrogen gas.

The brown body is then fired in a sintering furnace in an atmosphere which is determined by the composition of the ceramic powder. Typically, a stream of nitrogen or argon at atmospheric pressure, may be utilized. The firing temperature, which again depends upon the nature of the selected ceramic powder, ranges from 1400° to 2200° C., for a time in the range of about 0.5 to 3 hours, to thereby obtain a ceramic preform, or a ceramic preform having graded porosity. In the case of a metal activated ceramic preform care must be taken not to oxidize the metal phase or it may not be desirable to melt the metal contained in the tape.

The variables controlling the sintered dimensions include the degree and uniformity of shrinkage during sintering, the density of the green part and the dimensions of the pressed green part.

The method of reactive infiltration used in the present case will now be briefly described, however, it is to be understood that several alternative methods are available.

The porous ceramic preform, or metal activated preform is placed in a crucible together with a predetermined amount of infiltrating metal. For example in the case of a porous $Ni/ZrO_2$ substrate being infiltrated with an Al alloy, the assembly is placed in a furnace which is under nitrogen atmosphere and the infiltration is carried out a few hundred degrees above the liquidus temperature of the infiltrating metal (in this case 900° C.) for various times depending on the depth of infiltration required. The sample is then furnace cooled and removed from the furnace. The composition and type of intermetallic formed is controlled by the relative amounts of the infiltrating metal and the amounts of metal activator and ceramic content of the preform, as well as stated previously, the time and temperature at which the infiltration step is performed. The reaction conditions whereby the desired intermetallic ceramic composite is formed are dictated by the nature of the infiltrating metal, the composition of the ceramic powder, and the reaction conditions, namely, atmosphere, temperature and time. The resultant microstructure consists of an interpenetrating or skeletal structure of ceramic interspersed with an intermetallic phase. An excess infiltrated metal phase may also be present. As will be evident to one skilled in the art, the method of infiltration will depend on the nature of the part being fabricated. For example, for composites having a homogenous composition, the porous preform can be hot dipped in a molten bath of the low melting point metal and then heat treated to achieve complete infiltration. A variant of this process would be to apply a flame or plasma sprayed coating of the low melting point metal to the porous part.

The product and process of the invention will now be described with reference to the following non-limitative examples.

EXAMPLE I

The first two examples demonstrate how the process of tape casting and lamination can be used to make a porous ceramic preform which requires a close degree of tolerance on its dimensions and consists of a ceramic structure.

$ZrO_2$ powder, containing between 3 to 5 wt % of a premixed $Y_2O_3$ sintering aid and with a particle size of 0.2 microns, starch with a particle size of 10 μm, fish oil (dispersant) Defloc Z3™, and toluene with ethyl alcohol were placed in a milling jar in the fractions indicated in Table II given herebelow. The milling jar was fabricated from nylon or polypropylene and the milling media consisted of pure zirconia balls, 1 cm in diameter. The mixture was then milled for 1 to 3 hours. A suitable binder, and a plasticizer, were added to the mixture in the ratio indicated in Table II. This mixture was milled for an additional 2 to 4 hours to dissolve the binder and plasticizer and obtain a homogeneous mixture. The slurry was cast onto a Mylar™ film using a doctor blade such that the thickness of the wet slurry ranged between 0.5 to 1.8 mm. The tape was dried in air under a fume hood for at least 24 hours. The dried tape thickness ranged between about 0.2 and 1.0 mm. Forms were cut from the tape and assembled within a suitable die. The filled die was placed in a press and the layers of tape were laminated together using pressures between 35 and 40 MPa. This pressure was held for 5 minutes and pressing was done at temperatures between room temperature and 80° C. All the organic additives were burned off by heating the green parts in a stream of air as shown in Table III herebelow. The brown body was carefully transferred to a sintering furnace and fired in air at temperatures between 1400° and 1475° C.

TABLE II

| Compound | Weight % (in suspension) | Volume % (in dried tape) |
|---|---|---|
| Zirconium Oxide | 43.5 | 27.1 |
| Starch | 11.7 | 29.1 |
| Defloc Z3 ™ | 1.4 | 0.9 |
| Toluene | 18.5 | N/A |
| Ethyl alcohol | 12.3 | N/A |
| Butvar B79 ™ | 4.0 | 13.7 |
| Santicizer 160 ™ | 8.6 | 29.2 |

Table III below provides the burnout cycle employed.

TABLE III

| Temperature Range (° C.) | Heating Rate (° C./min.) | Hold Time at Maximum Temperature (min.) |
|---|---|---|
| 25–133 | 1 | 60 |
| 133–142 | 0.1 | 60 |
| 142–161 | 0.1 | 60 |
| 161–180 | 0.1 | 60 |
| 180–218 | 0.1 | 60 |
| 218–335 | 0.1 | 60 |
| 335–975 | 1.5 | 120 |
| 975–25 | Furnace cool | N/A |

EXAMPLE II

Zirconia powder premixed with yttria sintering aid in the range 3 to 5 wt % and with a particle size of 0.2 μm, graphite platelets with an average particle size of 75 μm, fish oil (dispersant), toluene and ethyl alcohol were placed in a plastic milling jar containing pure zirconia milling media in the ratio indicated in Table IV. This mixture was milled for 1 to 3 hours. A suitable binder and plasticizer, in this case Butvar B79™ and Santicizer 160™ respectively, were added to the mill in the ratio indicated by Table IV. The mixture was milled for an additional 2 to 4 hours to dissolve the binder and plasticizer and obtain a homogeneous mixture. The slurry was cast on to Mylar™ film to form a thin tape and heat treated in a similar way to that described in Example I.

TABLE IV

| Compound | Weight % (in suspension) | Volume % (in dried tape) |
|---|---|---|
| Zirconium Oxide | 36.4 | 22.0 |
| Graphite | 15.9 | 26.1 |
| Defloc Z3 ™ | 1.6 | 5.9 |
| Toluene | 19.6 | N/A |
| Ethyl alcohol | 12.7 | N/A |
| Butvar B79 ™ | 7.0 | 23.7 |
| Santicizer 160 ™ | 6.7 | 22.3 |

EXAMPLE III

Examples III and IV describe the preparation of a ceramic preform containing a metal activator therein.

Zirconia powder premixed with yttria sintering aid in the range 3 to 5 wt % and with a particle size of 0.2 μm, starch powder with a particle size of 10 μm, Ni powder with a particle size of about 1 μm, fish oil (dispersant), toluene and ethyl alcohol were placed in a plastic milling jar containing pure zirconia milling media in the ratio indicated in Table V. This mixture was milled for 1 to 3 hours. Butvar B79™ and Santicizer 160™ respectively were added to the mill in the ratio indicated by Table V. The mixture was milled for an additional 2 to 4 hours to dissolve the binder and plasticizer and obtain a homogeneous mixture. The slurry was cast on to a Mylar film to form a thin tape of thickness between 0.2 and 1.0 mm. Laminates were made and burned out and partially sintered in a similar fashion to that described in Example I. However, during this burnout step the metal powder (activator) in the preform oxidizes. An additional step is used in this case where the preform is heated to 600° C. in a hydrogen atmosphere (or other suitable reducing atmosphere) to deoxidize the metal phase. Following this, the final sintering step was carried out in a partial vacuum of argon gas at 1400° C. to sinter the zirconia powder and avoid oxidation or melting of the Ni powder.

TABLE V

| Compound | Weight % (in suspension) | Volume % (in dried tape) |
|---|---|---|
| Zirconium Oxide | 23.5 | 15.4 |
| Starch | 10.3 | 27.1 |
| Nickel | 23.5 | 10.6 |
| Defloc Z3 ™ | 1.4 | 5.5 |
| Toluene | 17.9 | N/A |
| Ethyl alcohol | 11.9 | N/A |
| Butvar B79 ™ | 5.5 | 20.1 |
| Santicizer 160 ™ | 6.0 | 21.3 |

EXAMPLE IV

Tungsten carbide premixed with 6 wt % Co powder as a binding agent and with a particle size of 1.0 μm, starch powder with a particle size of 10 μm, Ni powder with a particle size of about 1 μm, fish oil (dispersant), toluene and ethyl alcohol were placed in a plastic milling jar containing pure zirconia milling media in the ratio indicated in Table VI. This mixture was milled for 1 to 3 hours. Butvar B79™ and Santicizer 160™ respectively were added to the mill in the ratio indicated by Table VI. The mixture was milled for an additional 2 to 4 hours to dissolve the binder and plasticizer and obtain a homogeneous mixture. The slurry was cast on to Mylar film to form a thin tape of thickness between 0.2 and 1.0 mm. Laminates were made and burned out and partially sintered in a similar fashion to that described in Example I. Deoxidization and sintering of the preform was carried out in a similar way to that described in Example III.

TABLE VI

| Compound | Weight % (in suspension) | Volume % (in dried tape) |
| --- | --- | --- |
| Tungsten Carbide | 38 | 28 |
| Cobalt | 2.4 | 1.2 |
| Starch | 8.6 | 25.4 |
| Nickel | 25.1 | 12.7 |
| Defloc Z3 ™ | 0.9 | 3.9 |
| Toluene | 10.7 | N/A |
| Ethyl alcohol | 7.2 | N/A |
| Butvar B79 ™ | 4.2 | 17.2 |
| Santicizer 160 ™ | 2.9 | 11.6 |

EXAMPLE V

This example describes the spontaneous infiltration of a ceramic/metal activated preform.

A porous zirconia preform containing a nickel metal activating phase was prepared using the method depicted in Example III. A slug of pure aluminum metal was placed on top of the preform and both were placed on top of a fully dense alumina plate. The assembly was placed in a furnace at 950° C. for 3 hours in an atmosphere of flowing nitrogen. As the aluminum metal melted, it infiltrated the porous zirconia preform and reacted with the Ni activator, Consequently nickel aluminide intermetallic phases were produced which filled the porosity to form a substantially dense interpenetrating intermetallic/ceramic composite. The sample was then cooled to solidify the metal component. In some regions of the microstructure small amounts of pure aluminum were still present. The figures show the process in greater detail.

It will be understood, of course, that other embodiments and examples of the invention will be readily apparent to a person skilled in the art, the scope and purview of the invention being defined in the appended claims.

The embodiments in which an exclusive property or privilege are claimed are defined by the claims which now follow:

1. A process for preparing a ceramic preform having graded porosity and adapted for reactive metal infiltration processing which comprises:
   1) preparing tapes having controlled microporosities by:
      a) preparing various colloidal suspensions formed from a ceramic powder, having a particle size in the range of about 0.2 to 2.0 microns, in admixture with a binder, a dispersant, a plasticizer, a solvent and at least one pyrolysable pore forming agent;
      b) casting said colloidal suspensions into discrete thin sheets; and
      c) drying said sheets to thereby form tapes having preselected pliability properties and microporosities, said microporosities being determined by adding varying amounts and/or particle sizes of pore forming agents to the differing colloidal suspensions, to thereby form tapes having differing porosities;
   2) preparing tapes having controlled microporosities and having varying quantities of metal activator embedded therein by:
      a) preparing various colloidal suspensions formed from a ceramic powder, having a particle size in the range of about 0.2 to 2.0 microns, in admixture with a binder, a dispersant, a plasticizer, a solvent, at least one pyrolysable pore forming agent and a particulate metal activator;
      b) casting said colloidal suspensions into discrete thin sheets;
      c) drying said sheets to thereby form tapes having preselected pliability properties and porosities, said porosities being determined by varying the quantity and particle size of the added pore forming agent, and having preselected amounts of dispersed metal activator embedded therein said metal activator being present in differing quantities thereby forming tapes having differing metal activator content;
   3) cutting shaped pieces of the tapes formed by steps (1) and (2);
   4) selectively layering a predetermined number of said tape pieces, in varying combinations, within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;
   5) heating said green body at a controlled rate, at temperatures effective to remove the pyrolysable suspension additives and form a brown body;
   6) deoxidizing the brown body by heating it in a reducing atmosphere to thereby convert any formed metal oxides to the metal; and
   7) firing said brown body at temperatures effective to sinter the ceramic structure to a predetermined degree for a time in the range of about 0.5 to 3 hours to thereby form the porous ceramic preform having controlled, and graded microporosity and having a metal activator embedded therein.

2. A process as set forth in claim 1, wherein said ceramic powder is selected from a group consisting of zirconium oxide, tungsten carbide, aluminum oxide, aluminum nitride, silicon carbide, silicon nitride and mixtures thereof, said binder is selected from the group consisting of polymerized alcohols, butyryl and acrylic resins, said dispersant is selected from the group consisting of phosphate esters, ethoxylate of castor oil, polyethylene oxyethanol and fish oil, said plasticizer is selected from the group consisting of butylbenzyl phthalate, ethylene glycol, dietylene phthalate and triethylene phthalate, said solvent is selected from the group consisting of toluene, methyl ethyl ketone, ethanol, isopropanol, methanol, hexane, ethyl acetate, trichloroetylene and mixtures thereof, said pore forming agent is selected from the group consisting of carbon, graphite, starch and polyethylene and said particulate metal activator is selected from the group consisting of nickel, copper, molybdenum, titanium, iron and ziconium.

3. A process for preparing an intermetallic/ceramic/metal composite having a graded composition which comprises:
   1) preparing tapes having controlled microporosities by:
      a) preparing various colloidal suspensions formed from a ceramic powder, having a particle size in the range of about 0.2 to 2.0 microns, in admixture with a binder, a dispersant, a plasticizer, a solvent and at least one pyrolysable pore forming agent;

b) casting said colloidal suspensions into discrete thin sheets; and c) drying said sheets to thereby form tapes having preselected pliability properties and microporosities, said microporosities being determined by adding varying amounts and/or particle sizes of pore forming agents to the differing colloidal suspensions, to thereby form tapes having differing porosities;

2) preparing tapes having controlled microporosities and having varying quantities of metal activator embedded therein by:

a) preparing various colloidal suspensions formed from a ceramic powder, having a particle size in the range of about 0.2 to 2.0 microns, in admixture with a binder, a dispersant, a plasticizer, a solvent, at least one pyrolysable pore forming agent and a particulate metal activator;

b) casting said colloidal suspensions into discrete thin sheets;

c) drying said sheets to thereby form tapes having preselected pliability properties and porosities, said porosities being determined by varying the quantity and particle size of the added pore forming agent, and having preselected amounts of dispersed metal activator embedded therein said metal activator being present in differing quantities thereby forming tapes having differing metal activator content;

3) cutting shaped pieces of the tapes formed by steps (1) and (2);

4) selectively layering a predetermined number of said tape pieces, in varying combinations, within a forming member, and compacting said layers at pressures ranging from between about 10 to 60 MPa, at temperatures ranging from between about 25° C. to 75° C. for a time ranging from between about 0.5 to 5 minutes to laminate said tape components and form a green body;

5) heating said green body at a controlled rate, at temperatures effective to remove the pyrolysable suspension additives and form a brown body;

6) deoxidizing the brown body by heating it in a reducing atmosphere to thereby convert any formed metal oxides to the metal; and 7) firing said brown body at temperatures effective to sinter the ceramic structure to a predetermined degree for a time in the range of about 0.5 to 3 hours to thereby form the porous ceramic preform having controlled, and graded microporosity and having a metal activator embedded therein; and 8) reactively infiltrating said ceramic preform with a molten metal under predetermined reaction conditions effective to form the desired intermetallic phase whereby said intermetallic/ceramic/metal composite has a graded composition.

4. The process as set forth in claim 3, wherein said ceramic powder is selected from the group consisting of zirconium oxide, tungsten carbide, aluminum oxide, aluminum nitride, silicon carbide, silicon nitride and mixtures thereof, said binder is selected from the group consisting of polymerized alcohols, butyryl and acrylic resins, said dispersant is selected from the group consisting of phosphate esters, ethoxylate of castor oil, polyethylene oxyethanol and fish oil, said plasticizer is selected from the group consisting of butylbenzyl phthalate, ethylene glycol, diethylene phthalate and triethylene phthalate, said solvent is selected from the group consisting of toluene, methyl ethyl ketone, ethanol, isopropanol, methanol, hexane, ethyl acete, trichloroethylene and mixtures thereof, said pore forming agent is selected from the group consisting of carbon, graphite, starch and polyethylene, said metal activator is selected from the group consisting of nickel, copper, molybdenum, titanium, iron and zirconium and said infiltrating metal is selected from the group consisting of aluminum, nickel, copper, silicon, iron and alloys formed therefrom.

* * * * *